Patented Apr. 6, 1954

2,674,320

UNITED STATES PATENT OFFICE 2,674,320

RETARDED SET CEMENT SLURRY

Howard G. Cutforth, Bartlesville, Okla., assignor to Phillips Petroleum Company, a corporation of Delaware No Drawing. Application December 12, 1949, Serial No. 132,627

16 Claims. (Cl. 166—22)

This invention relates to retarded set cement slurries. In one specific aspect it relates to retarded set cement aqueous slurries comprising hydraulic cement, such as Portland cement, with or without non-cementing inert granular aggregate material, which hydraulic cement may or may not contain the usual minor additives common to hydraulic cements, such as calcium sulfate and/or calcium chloride as examples in amounts up to 3%, sufficient water to make a slurry, and a small but effective amount of a set retarding additive soluble in said aqueous hydraulic cement slurry selected from the group consisting of acid sulfobenzyl inulin ether, acid sulfobenzyl inulin ethers in which one or more of the hydrogen atoms of the alpha $CH_2$ has been replaced by a methyl, ethyl, or normal or isopropyl radical, and salts of said ethers, ethers with alkylene groups of 4 carbon atoms or fewer being preferred, and the alkali metal, alkaline earth metal and ammonium salts of said ethers being preferred. There are only six alpha substituted sulfobenzyl inulin ethers, known as alpha-alkyl-sulfobenzyl inulin ethers, covered by the preceding sentence. They are:

Alpha-methylsulfobenzyl
Alpha-ethylsulfobenzyl
Alpha-n propylsulfobenzyl
Alpha-isopropylsulfobenzyl
Alpha-alpha-di-methylsulfobenzyl
Alpha-methyl-alpha-ethylsulfobenzyl The alkylene group referred to as having four or fewer carbon atoms includes whatever alkyl group, or groups, have been added to the alpha methylene portion of the sulfobenzyl along with said alpha methylene portion.

When one or more of the hydrogen atoms of the alpha-$CH_2$ group has been replaced by a methyl, ethyl or propyl radical, the carbon atom of said alpha-$CH_2$ group along with the carbon atoms of said methyl, ethyl or propyl radicals, form a single alkylene group in each respective ether. It is this single alkylene group which preferably has four carbon atoms or fewer, and when this is true, there can be only six alpha-substituted sulfobenzyl inulin ethers, known as alpha-alkyl sulfobenzyl inulin ethers, having four carbon atoms or fewer in said alkylene group, as covered by the last sentence of the first paragraph of the present application.

Acid sulfobenzyl inulin ether, acid sulfobenzyl inulin ether in which one or more of the hydrogen atoms of the alpha-$CH_2$ has been replaced by a methyl, ethyl or propyl radical, and salts of said ethers, employed in the present invention, are preferably produced by the novel process for the production of novel sulfonated phenyl alkyl ethers of starch, dextrin and inulin, which is the invention of R. Vernon Jones and is disclosed and claimed in his copending application Serial No. 134,604 filed December 22, 1949, for "Process for Production of Sulfonated Phenylalkyl Ethers of Starch, Dextrin and Inulin." The discovery of the useful properties of such inulin ethers in hydraulic cement aqueous slurries is the invention of the present applicant, Howard G. Cutforth, and is claimed in the present application.

In the art of cementing oil wells and in grouting cracks in masonry structures there is a tendency for the cement slurry to set prematurely, with the result that it can not be properly placed in position due to an increase in viscosity of the slurry, and resulting increases in force necessary to pump or move the slurry into position.

I have found that by adding a small but effective amount of a selected additive comprising a set retarding additive soluble in an aqueous hydraulic cement slurry selected from the group consisting of acid sulfobenzyl inulin ether, acid sulfobenzyl inulin ethers in which one or more of the hydrogen atoms of the alpha $CH_2$ group has been replaced by a methyl, ethyl, or normal or iso propyl radical, and salts of said ethers, ethers with alkylene groups of 4 carbon atoms or fewer being preferred, to a slurry of water and a hydraulic cement, preferably ordinary commercial Portland cement containing the usual additives, that the thickening time and thereby time of set, as determined by tests is greatly increased and the cement slurry is easy to pump and place in a well before it sets.

One object of the present invention is to provide an increased time of set cement slurry useful in grouting in general, in cementing the walls of wells, and for cementing pipe in wells.

Another object is to provide a retarded set cement which is easy to pump into place in a well, or other close place.

Another object is to provide a cement slurry suitable for use in oil well cementing operations.

Numerous other objects and advantages will be apparent upon reading the accompanying specification and claims.

In preparing the slurry the dry ingredients comprising hydraulic cement, with or without additives for increasing the time of set, the inert filler material, such as sand or crushed limestone, and said selected additive may be mixed together and later mixed with water, or any of them may be mixed separately with water, and then mixed together to form the cement slurry, as long as the mixing of the hydraulic cement with water is done promptly before placing the slurry in position.

By hydraulic cement I intend to include all mixtures of lime, silica, and alumina, or of lime and magnesia, silica, and alumina and iron oxide (magnesia for example may replace part of the lime, and iron oxide a part of the alumina) as are commonly known as hydraulic cements. Hydraulic cements include hydraulic limes, grappier cements, puzzalan cements, natural cements, and Portland cements. Puzzalan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements.

In most oil well cementing and grouting operations it is generally desirable to use neat cement for added strength, but obviously it is always possible to add any desired amount of an inert granular filling material or aggregate such as sand, ground limestone, or any of the other well known inert aggregates, as long as the amount added does not reduce the strength below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical, it being obvious that sufficient water should be added to form a pumpable slurry, and that when the slurry becomes pumpable no further water need be added.

Inulin is also called alanthin, alant starch, sinistrin, menyanthin, or dahlin, and consists of a white, hygroscopic, starch-like carbohydrate the formula of which is possibly $(C_6H_{10}O_5)_x$ where C is carbon, H hydrogen, O oxygen and $x$ is an integer of the order of about 100. It melts and decomposes about 160° C. See Hackh's Chemical Dictionary, second edition (1937), page 491, published by Blakiston's Sons & Co. Inc. of Philadelphia, Pennsylvania. Other dictionaries are Concise Chemical and Technical Dictionary, 1947, Chemical Publishing Co., New York, page 503, and Condensed Chemical Dictionary, 3rd edition, 1942, Reinhold Publishing Co., New York, page 364, the latter mentioning the term "menyanthin."

Inulin sources are dahlias, Jerusalem artichokes, chickory, dandelions, burdock roots, golden rod roots and camas roots. Its prior art use is mainly making diabetic bread. The inulin used was chemically pure inulin, but obviously commercial grades will give valuable or equivalent results in cement slurries.

For the purpose of illustrating the material with a formula, inulin may be regarded as consisting of a number of glucoside residues $C_6H_{10}O_5$, each having three hydroxyl radicals —OH thereon. The residue $C_6H_{10}O_5$ is repeated a large number of times, represented by $n$, which may be 100 or more. Most of the OH radicals are unchanged, but enough of them are substituted (as will be explained below) to make the material water soluble. As degrees of substitution are difficult to determine, I have found that the degree of substitution rendering the material soluble in a water hydraulic cement slurry is a sufficient test for its utility. By soluble, I mean that it appears to be soluble to the eye, as whether it is a true solution or some sort of dispersion is not in question, the prior are referring to such materials as soluble. The material is of value to the extent that it is soluble, and border line substances may be used which are only partly or barely soluble, but better results are obtained when the material is clearly soluble.

With C representing carbon, H hydrogen, O oxygen, M a metal, or hydrogen, or some basic radical such as NH$_4$, and S sulfur, the following formula is that of acid sulfobenzyl inulin ether and its salts:

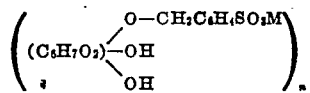

This formula is the same as the first formula in said Jones application Serial No. 134,604, except that the present formula is specific to acid sulfobenzyl inulin ether and its salts, whereas said Jones formula shows the ring structure and is generic to all sulfonated phenylalkyl ethers of starch, dextrin or inulin.

One or both of the hydrogen atoms in the alpha CH$_2$ group above may be substituted by a methyl, ethyl or normal or isopropyl radical except that the number of carbon atoms in the entire resulting alkylene group should not exceed four.

I have found that from 0.1% to 3% by weight of the dry cement of these additives is particularly effective in retarding the time of set of cement containing the same.

A Portland cement slurry was made up with water and Portland cement to weigh 16.3 pounds per gallon of slurry and divided into two portions, and 1% of sodium sulfobenzyl inulin by weight (based on the dry Portland cement) was added to the second portion of the sample.

The cement slurry used set at a rate such that in 0.8 hour the slurry attained a viscosity of 100 poises as determined by a consistometer. When 1% of sodium sulfobenzyl inulin ether was present this same viscosity was not reached until 10.2 hours had passed, which shows that these cements are retarded as to set and are useful in wells.

The cement slurry set into a hard cement suitable for use in well cementing and grouting.

In case the acid inulin ethers are employed the alkaline earth metal and alkali metal ions present in the slurry will make the salt and obviously all are equivalent.

It is obvious that inert filling material will not substantially affect the result of this test, when used in an amount not large enough to deleteriously reduce the strength of the cement slurry after setting.

The above example and tests are given for illustrative purposes and should not be regarded as limiting the invention, the scope of which is set forth in the following claims:

Having described my invention, I claim:

1. A cement capable of forming a fluid slurry when mixed with water, said cement comprising a hydraulic cement mixed with from 0.1 to 3% by weight of the dry cement of sodium sulfobenzyl inulin ether which is soluble in the cement slurry.

2. A cement capable of forming a fluid slurry when mixed with water, said cement comprising Portland cement mixed with from 0.1 to 3% by weight of the dry cement of sodium sulfobenzyl inulin ether which is soluble in the cement slurry.

3. A hydraulic cement slurry comprising a hydraulic cement, water, and from 0.1 to 3% by weight of the dry cement of sodium sulfobenzyl inulin ether which is soluble in the cement slurry.

4. A hydraulic cement slurry comprising Portland cement, water, and from 0.1 to 3% by weight of the dry cement of sodium sulfobenzyl inulin ether which is soluble in the cement slurry.

5. A cement capable of forming a fluid slurry when mixed with water, said cement comprising a hydraulic cement mixed with from 0.1 to 3% by weight of the dry cement of one of the group consisting of acid sulfobenzyl inulin ether, acid sulfobenzyl inulin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

6. A cement capable of forming a fluid slurry when mixed with water, said cement comprising Portland cement mixed with from 0.1 to 3% by weight of the dry cement of one of the group consisting of acid sulfobenzyl inulin ether, acid sulfobenzyl inulin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

7. A hydraulic cement slurry comprising a hydraulic cement, water, and from 0.1 to 3% by weight of the dry cement of one of the group consisting of acid sulfobenzyl inulin ether, acid sulfobenzyl inulin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

8. A hydraulic cement slurry comprising Portland cement, water, and from 0.1 to 3% by weight of the dry cement of one of the group consisting of acid sulfobenzyl inulin ether, acid sulfobenzyl inulin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

9. A cement capable of forming a fluid slurry when mixed with water, said cement comprising a hydraulic cement mixed with from 0.1 to 3% by weight of the dry cement of alkali metal sulfobenzyl inulin ether which is soluble in the cement slurry.

10. A cement capable of forming a fluid slurry when mixed with water, said cement comprising Portland cement mixed with from 0.1 to 3% by weight of the dry cement of alkali metal sulfobenzyl inulin ether which is soluble in the cement slurry.

11. A hydraulic cement slurry comprising a hydraulic cement, water, and from 0.1 to 3% by weight of the dry cement of alkali metal sulfobenzyl inulin ether which is soluble in the cement slurry.

12. A hydraulic cement slurry comprising Portland cement, water, and from 0.1 to 3% by weight of the dry cement of alkali metal sulfobenzyl inulin ether which is soluble in the cement slurry.

13. The process of producing a hydraulic cement aqueous slurry having an increased thickening time which comprises admixing with hydraulic cement from 0.1 per cent to 3 per cent by weight of the dry cement of one of the group consisting of acid sulfobenzyl inulin ether, acid sulfobenzyl inulin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry, and interacting therewith sufficient water to produce a fluid slurry.

14. The process of cementing a well which extends into a porous formation which comprises placing a hydraulic cement aqueous slurry having an increased thickening time by admixing with hydraulic cement from 0.1 per cent to 3 per cent by weight of the dry cement of one of the group consisting of acid sulfobenzyl inulin ether, acid sulfobenzyl inulin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry, interacting therewith sufficient water to produce a fluid slurry, and introducing said slurry into said well into contact with said porous formation.

15. The process of producing a hydraulic cement aqueous slurry having an increased thickening time which comprises admixing with hydraulic cement from 0.1 per cent to 3 per cent by weight of the dry cement of sodium sulfobenzyl inulin ether which is soluble in the cement slurry and interacting therewith sufficient water to produce a fluid slurry.

16. The process of cementing a well which extends into a porous formation which comprises placing a hydraulic cement aqueous slurry having an increased thickening time by admixing with hydraulic cement from 0.1 per cent to 3 per cent by weight of the dry cement of sodium sulfobenzyl inulin ether which is soluble in the cement slurry, interacting therewith sufficient water to produce a fluid slurry and introducing said slurry into said well into contact with said porous formation.

References Cited in the file of this patent

UNITED STATES PATENTS

| Number | Name | Date |
|---|---|---|
| 2,562,148 | Lea et al. | July 24, 1951 |